United States Patent [19]

Katz et al.

[11] Patent Number: 5,727,440

[45] Date of Patent: Mar. 17, 1998

[54] GAS CYLINDER ELEMENT

[75] Inventors: Wolfgang Katz, Dauchingen; Franz Preuss, Villingen-Schwenningen, both of Germany

[73] Assignee: Danly Corporation, Miami, Fla.

[21] Appl. No.: 707,223

[22] Filed: Sep. 3, 1996

[30] Foreign Application Priority Data

May 15, 1996 [DE] Germany .................. 296 08 818.8

[51] Int. Cl.⁶ .................................................. F15B 21/04
[52] U.S. Cl. ........................... 91/4 R; 92/142; 92/163
[58] Field of Search ........................... 91/4 R; 92/81, 92/134, 142, 163

[56] References Cited

U.S. PATENT DOCUMENTS

| | | | |
|---|---|---|---|
| 1,812,533 | 6/1931 | Hunt | 91/4 R X |
| 1,898,645 | 2/1933 | Slater | 92/163 X |
| 2,490,823 | 12/1949 | Manning | 91/4 R X |
| 2,949,894 | 8/1960 | Hewitt | 91/4 R X |
| 2,994,301 | 8/1961 | Kirsch | 91/4 R X |
| 3,494,027 | 2/1970 | Harelson | 91/4 R X |
| 3,500,759 | 3/1970 | Potter et al. | 92/163 X |
| 4,268,007 | 5/1981 | Chittenden | 91/4 R X |
| 4,729,224 | 3/1988 | McAteer | 91/4 R X |

FOREIGN PATENT DOCUMENTS

| | | |
|---|---|---|
| 44 26 393 C1 | 11/1995 | Germany . |
| 0593893 | 2/1978 | U.S.S.R. .................. 91/4 R |

*Primary Examiner*—Hoang Nguyen
*Attorney, Agent, or Firm*—Stein, Pendorf & Van Der Wall

[57] ABSTRACT

A gas spring element or gas cylinder element, particularly suitable for presses for non-cutting forming, including a closed non-compressible fluid system which includes the ring space between the piston or as the case may be piston rod and the cylinder or as the case may be cylinder head, wherein manipulation of the flow of fluid, which results from displacement movement of the piston, is used to hold the piston in the extended position and also to initiate release the piston rod, optionally including rate of return of the piston. Therewith there is achieved a complete timewise decoupling of the return stroke movement of a press ram and a piston rod.

14 Claims, 3 Drawing Sheets

5,727,440

GAS CYLINDER ELEMENT

BACKGROUND OF THE INVENTION

1. Field of the Invention

The invention concerns a gas spring element or gas cylinder element, in particular for presses for non-cutting forming, according to the precharacterizing portion of Claim 1.

2. Description of the Related Art

Gas cylinder elements in general have been used for example in presses for the non-cutting forming processes and are increasingly employed as substitutes for coil springs or rubber springs. In comparison to these conventional spring elements they possess a number of advantages, such as for example a longer life, a smaller structural space or a more advantageous spring rate.

Heretofore known gas spring elements are comprised of a tank reservoir, in which recesses or bores are provided as pressure gas reservoirs. Therein there is to be found for example nitrogen under a pressure of for example 110 bar. In the tank reservoir there is provided at least one cylinder, most usually however a number of cylinders, sealed against high pressure, wherein the cylinder space is in communication with a pressure gas reservoir. Provided within the cylinder is a piston sealed against high pressure which, beginning from a zero or rest point, (top dead center) is slidably mounted for axial displacement against the gas which is under pressure. On the side opposite to the piston bottom, the piston is provided with a piston rod, which extends through the cylinder at the cylinder head and serves as the force introduction element.

Upon introduction of pressure, that is, by impacting upon the piston rod, the piston is displaced against the pressure of the gas, so that the gas is further compromised. As a consequence a pressure of approximately 120 bar is achieved in the pressure gas reservoir. After removal of the load the piston returns to its starting point and the pressure in the pressure gas reservoir assumes its original start value.

For enhancing longevity it has been proposed in EP 0 522 373 A1, to form a ring space between, for example, the piston or, as the case may be, piston rod and the cylinder or, as the case may be, the cylinder head, of which the height and therewith the volume can be changed dependent upon the position of the piston in the cylinder, and to fill oil into the ring space. Hereby a type of lubricant reservoir is formed, which optimally lubricates the contact surface of the inner wall of the cylinder even during continuous use and as a result of reduced friction substantially precludes in principal an undesired temperature elevation in the pressure reservoir.

Although the above described gas cylinder element has proven itself valuable in practice, there remains now as before the problem that the press is mechanically strongly loaded or stressed not only during the actual work stroke but however also during the return stroke of the piston. Thus the force inputting element acts with full force also during the return movement for example upon the ram or push rod and presses this with full vigor back to the top dead center point. Further there remains the danger, that the gas cylinder element during the return to the starting position itself suffers damage. This problem makes it necessary, to precisely tailor the gas cylinder element to the stroke of the press ram.

It was thus proposed in DE 44 26 393, which is the starting point for the present invention, to completely fill the ring space provided between the piston or, the case may be, piston rod and the cylinder or, as the case may be, cylinder head with oil and to use this cyclical volume fluctuation, which is a function of the stroke movement of the piston, for pumping the oil in a closed circuit, wherein as a result of the provision of valves the volume increase during the downward directed pre-stroke can occur substantially without hindrance, on the other hand the volume reduction during the return stroke can be impeded by means of a butterfly, choke or throttle valve. Depending upon the setting of the throttle valve or as the case may be the arrangement of the choke, the return movement can be delayed to such an extent, that only a relatively small force is exercised upon the pressure ram, and in extreme cases the return movement of the piston rod is substantially decoupled from the return movement of the ram. In this manner the loads upon the press are substantially reduced.

With the above described gas cylinder elements it can be accomplished, that the press ram returns to the starting point without mechanical contact with the piston rod, wherein as a result of appropriate arrangement of the oil circuit the return speed of the piston rod and also the time separation from the advanced running press ram is variable. Nevertheless, a complete decoupling of both return movements is not possible. The piston rod follows the press ram with a more or less large time interval as necessary, wherein the return movements begin at more or less the same time point and the return movement of the piston rod occurs essentially delayed. For a series of applications, in particular for drawing and bending work tools or also with progression work tools for autobody construction, it can be advantageous, that the return movement of the piston rod is not only throttled, but is retained for a pre-determined amount of time at the bottom dead center. This can be advantageous, in order that a work piece can be removed following forming without hindrance, or further work processing steps can be undertaken. For such purposes it is not sufficient, that the return stroke of the piston rod is allowed to run essentially only throttled, but rather the piston rod must be positively influenced, so that its return stroke is only then initiated, when the work processing sequence permits. In order to do this it is necessary, that the return stroke of the piston rod is completely independent from the return stroke of the press ram in the equipment design.

SUMMARY OF THE INVENTION

The invention is thus concerned with the problem, of improving a gas cylinder element of the type described in the above introductory section, so that the initiation of the return stroke can be made completely independent from the return stroke of the press ram.

The problem is solved by a gas spring element or gas cylinder element including a closed non-compressible fluid system which includes the ring space between the piston or as the case may be piston rod and the cylinder or as the case may be cylinder head, wherein manipulation of the flow of fluid, which results from displacement movement of the piston, is used to hold the piston in the extended position and also to initiate release the piston rod, optionally including rate of return of the piston. Therewith there is achieved a complete timewise decoupling of the return stroke movement of a press ram and a piston rod.

The invention is based upon the idea, of constructing a closed fluid system which includes the ring space between the piston or as the case may be piston rod and the cylinder or as the case may be cylinder head and through deliberate intentional influencing of the fluid stream, which is produced by the displacement movement of the piston, to release the piston rod for the return stroke only at a predetermined point in time. Therewith there is achieved a complete timewise decoupling of the two return stroke movements and an opening of the possibilities for optimal construction of the shaping and work processes with, in particular, presses.

In concrete terms this is achieved thereby, that the ring space intermediate the gas cylinder element is in fluid type communication via a conduit with the oil reservoir for formation of a closed fluid system, which is completely filled with oil. In the conduit between the oil reservoir and the ring space there is provided a controllable 2/2 way valve, which opens or blocks the conduit cross-section respectively according to the position of the valve. During the downward movement of the piston, which is being driven downwards by the press ram, a circuit or conduit is opened, so that oil can flow out of the oil reservoir and into the ring space. Upon reaching the bottom dead center the valve is closed, so that a return flow of oil out of the ring space and into the oil reservoir is prevented. The piston has, as a result of the spring effect of the gas under pressure, a desire to return the top dead center. It is however prevented from doing so by the oil which is to be found in the ring space and is thus fixed in its bottom dead center.

This condition remains so long, until as a result of a manipulation of the valve, the conduit is newly unconstrained. Only then can oil be returned back out of the ring space into the oil reservoir until the piston or the case may be piston rod again attains its top dead center position.

The detaining effect is based thereon, that the fluid system is completely filled with a substantially incompressible medium such as oil, so that the movement process cannot be carried out by overriding the compressible medium. In particular it must be insured that no amount of air influences are found in the fluid system, since in that case the piston or as the case may be the piston rod is no longer detained in the bottom dead center, but rather returns partially along a not to be prevented stroke. A certain amount of compression effect is however not to be avoided in practice since even oil has a certain amount of compressibility, which however does not result in a functional detriment in relation to the above-described intended utility.

In this regard the fluid system may, in a preferable case, be operating under an increased pressure with respect to atmospheric pressure. In practice, system pressures in the area of between 5 and 100 bar have been found to be effective, whereby the best results have been found with pressures in the range of 20 to 50 bar.

Conventional storage tanks with pressure equalization membranes have been found suitable as oil reservoirs. The pressure equalization membrane serves therefore, to equilibrate the system pressure in the fluid or to maintain it within certain pre-determined limits, and these being independent of the instantaneous position of the piston and therewith also the partial volume extracted from the oil reservoir which corresponds to the instantaneous volume of the ring space. For this there may be employed in a known manner a pressure equalization membrane which on its side opposite the side facing the fluid system—and this being the oil—interfaces with a gas which is maintained under pressure, which corresponding to the pressure equalization membrane displaces the actual volume capacity of the oil.

An extraordinarily compact construction manner can be realized, when at least a part of the conduit, which connects the ring space with the oil reservoir, is integrated in the gas spring element. This occurs in a preferred manner thereby, that in the cylinder a channel is provided, which on its one end is in communication with the ring space and oppositely, that is on its other end, is in communication with a bore, which is provided in the tank platform, wherein the bore of the tank platform extends outwardly to an external coupling to a further circuit segment.

The channel in the cylinder can completely extend through the cylinder head in the upwards direction, so that a ventilation opening for the fluid system results, which can be completely closed off with a vent screw. Through this opening, on the one hand, oil can be added to the fluid system, and on the other hand, it becomes possible in a simple manner and means to remove gas from the fluid system, which is necessary for prevention of the above-mentioned compression effect contributable to enclosed gaseous components. In a preferred embodiment there is at the upper end of the ring space and in the immediate vicinity adjacent the cylinder head a circumscribing notch provided, which is cut in to such a depth, that it forms a channel. This makes possible, during an operational downwards movement of the piston, an even infusion into the ring space, since the oil is introduced about the entire circumstance of the piston.

It is preferred that a circumscribing notch is provided at the outside of the cylinder, which on the one side is in communication with the channel, on the other side is in connection with the bore in the tank platform, which runs to the outside. This notch is advantageous in particular in construction and assembly, in that during seating of the cylinder, independent of the angular position to be achieved by the cylinder with respect to the tank platform, under all conditions the connection between the channel and the bore is produced. Therewith—as is the rule in practice—the cylinder can be screwed into the tank platform via threading, without the need for paying attention to any relative angular relationship to the end condition, as would be necessary in the case of the provision of a simple radial bore. In the sense of a functional reversal it is however also possible, to provide the circumscribing notch in the tank platform, so that on the cylinder eradial bore is provided as transition to the channel.

It has proven itself to be advantageous, to provide the valve as close as possible to the ring space. This can be accomplished in the simplest manner when the valve is provided immediately on the tank platform (and namely at the exit of the bore). This mounting or installation position is also easily accessible from the outside and requires no particular means of adaptation. In comparison to a positioning of the valve further away from the ring space there is to be seen the advantage, that as a result of the comparatively smaller oil volume the compression effects are less noticeable and therefore the fluid system is more stable and quicker to react.

Depending upon the utility it can be of advantage, when the flow resistance in the conduit is constructed to be variously adjustable. Therewith in particular the return speed of the piston can be varied. The fluid resistance can for example be realized by a change in the cross-section of the conduit, wherein there is fundamentally also the possibility, to accomplish this by means of valve. In this case, a type of valve is to be employed which, besides the above described switching positions, namely, the completely closed and the completely opened position of the conduit cross-section, makes possible various intermediate positions.

In principal the opening of the cross-section diameter for initiating of the upward movement of the piston rod or, as the case may be, piston can be accomplished through a time delay, for example with a pre-determined time delay in the realm of between 0 and 60 seconds. The time interval to be adjusted is dependent upon the actual circumstance and with consideration of, for example, the time requirement for the removal of the work piece out of the area of the press.

Finally it is also possible that the valve is controllable in response to a specific event. In a concrete case this can occur for example in a progress work tool by the press itself, when a particular work step, for example the boring of a thread, has been completed.

From the preceding it can be seen, that by employment of the inventive concept gas cylinder elements can be realized, which make possible the controlled initiation of the return movement of the piston rod or as the case may be piston.

In the following the invention will be described with reference to the illustrative embodiments shown in the figures. There is shown:

DETAILED DESCRIPTION OF THE INVENTION

Figure 1:
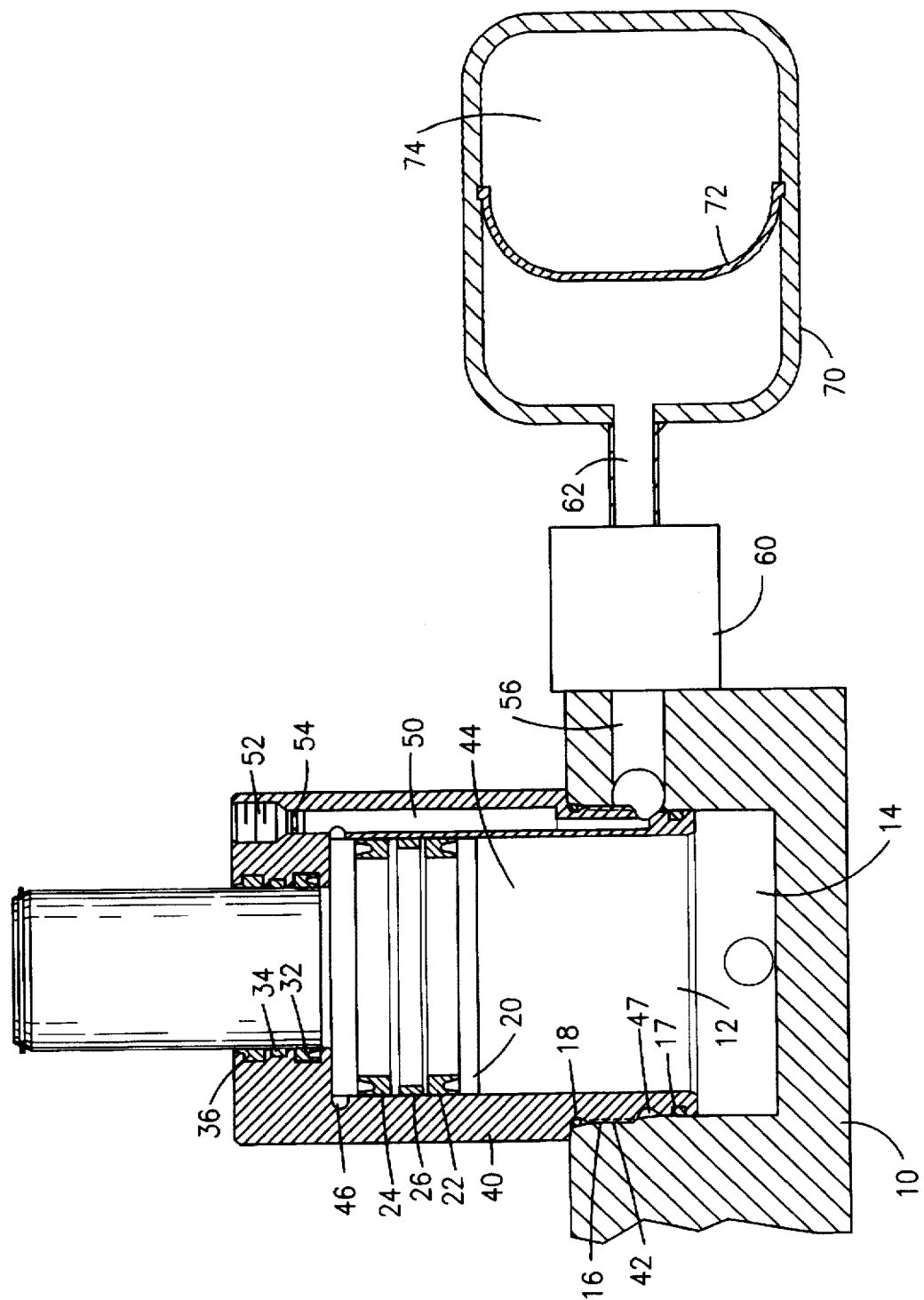
FIG. 1: Gas cylinder element with sectional representation, piston in top dead center.

The gas cylinder element is constructed upon a tank platform 10. The tank platform 10 has a recess 14 with a threading 16. Into this a cylinder 40 is seated, which has a corresponding outer threading 42. Between the cylinder 40 and the tank platform 10 a sealing ring 18 is inlaid, which insures a high pressure seal at the transition between the cylinder 40 and the tank platform 10.

The cylinder 40 is provided with a cylinder bore 44, of which the walls serve as a cylinder running surface for the therein guided piston 20. The piston 20 carries on its outer circumference two sealing rings 22, 24, by means of which the piston is sealingly engaged with the opposing cylinder running surface. Between the two sealing rings 22, 24 a guide band 26 is provided, which guides the piston 20 along the wall of the cylinder bore 44.

In the upwards direction the piston 20 transitions into a piston rod 30, which transitions through the cylinder 40 upwardly in the direction of a cylinder head 48. For sealing, a sealing ring 32 is provided at the cylinder head 48, which is directed against the piston rod 30. For guiding the piston rod 30 a guide ring 34 is provided in the cylinder head 48, along which the piston rod 30 glides. Finally, in the upper area of the cylinder head 48 a scrapper ring 36 is provided.

Below the piston 20, and thus within the cylinder bore 44 and transitioning into the recess 14 of the tank platform 10 there is formed a work space, which is sealed off against the environment. In the therein defined volume a gas, preferably nitrogen, is provided under high pressure (for example 110 bar) and this thus establishes a pressure gas reservoir 12. Upon a displacement of the piston 20 out of the top dead center (see FIG. 1 or 2) to the bottom dead center (see FIG. 3), that is, upon transitioning the maximal possible stroke, the pressure in the pressure gas reservoir 12 increases, wherein the amount of the pressure increase is substantially determined by the relationship of the stroke volume to the total volume of the pressure gas reservoir 12. In the preceding case the stroke volume corresponds to approximately 10% of the total gas volume, so that the pressure of the gas increases to about 120 bar.

Depending upon the application, the pressure gas reservoir 12 can achieve an increased volume thereby, that a recess 14 of the tank platform 10 is in communication with a supplemental container, for example, a conventional high pressure storage tank, so that the effective gas volume of the gas is increased. Frequently, also a multiplicity of gas cylinder elements are connected to a common tank platform 10, which are referred to as "manifolds". On the other hand, stand alone embodiments can be realized, in which the cylinder 40 is integrally formed with the tank platform 10 (so called "self-contained-cylinder").

Figure 2:
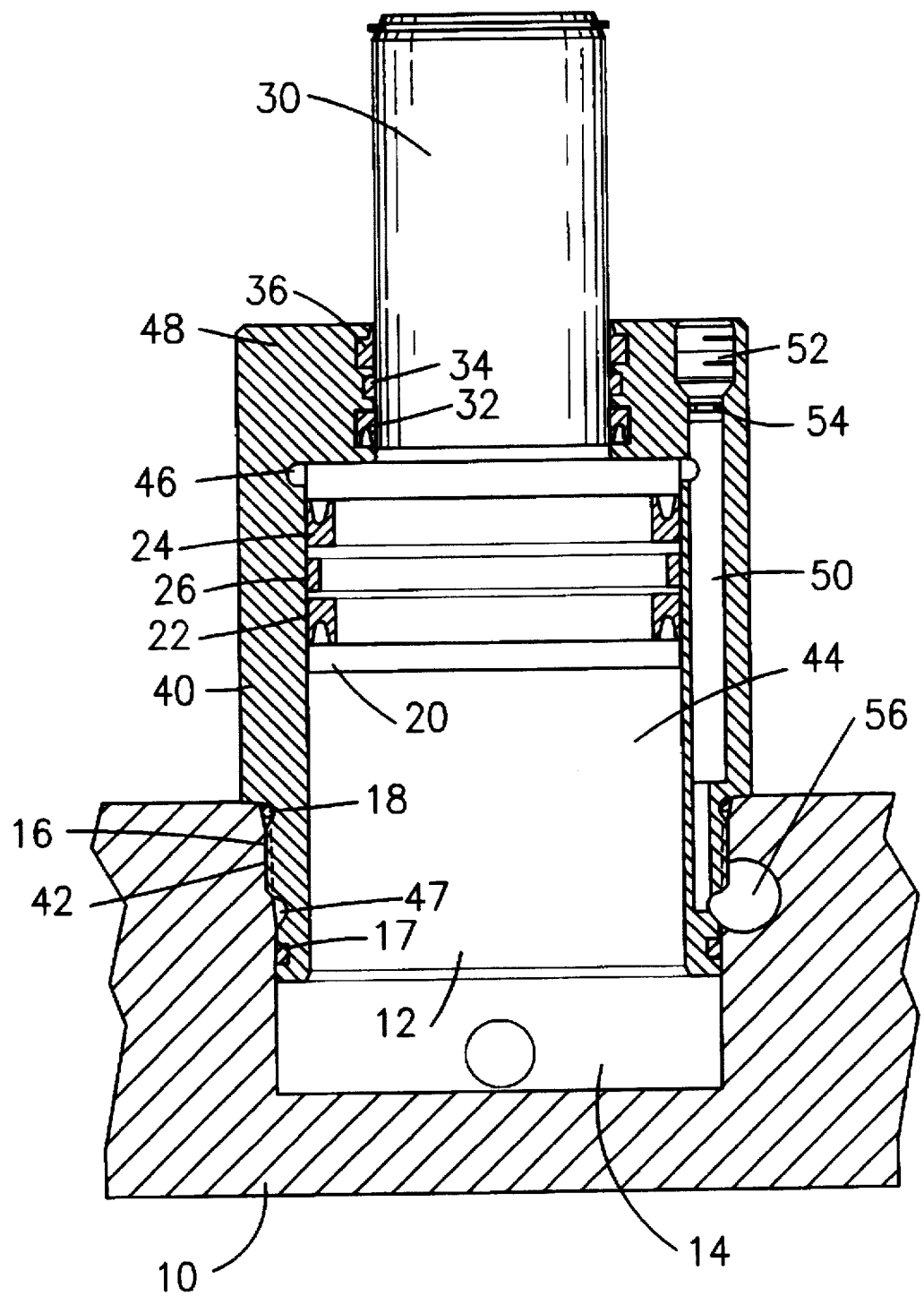
FIG. 2: Gas cylinder element according to FIG. 1, partial view, piston in top dead center.
Figure 3:
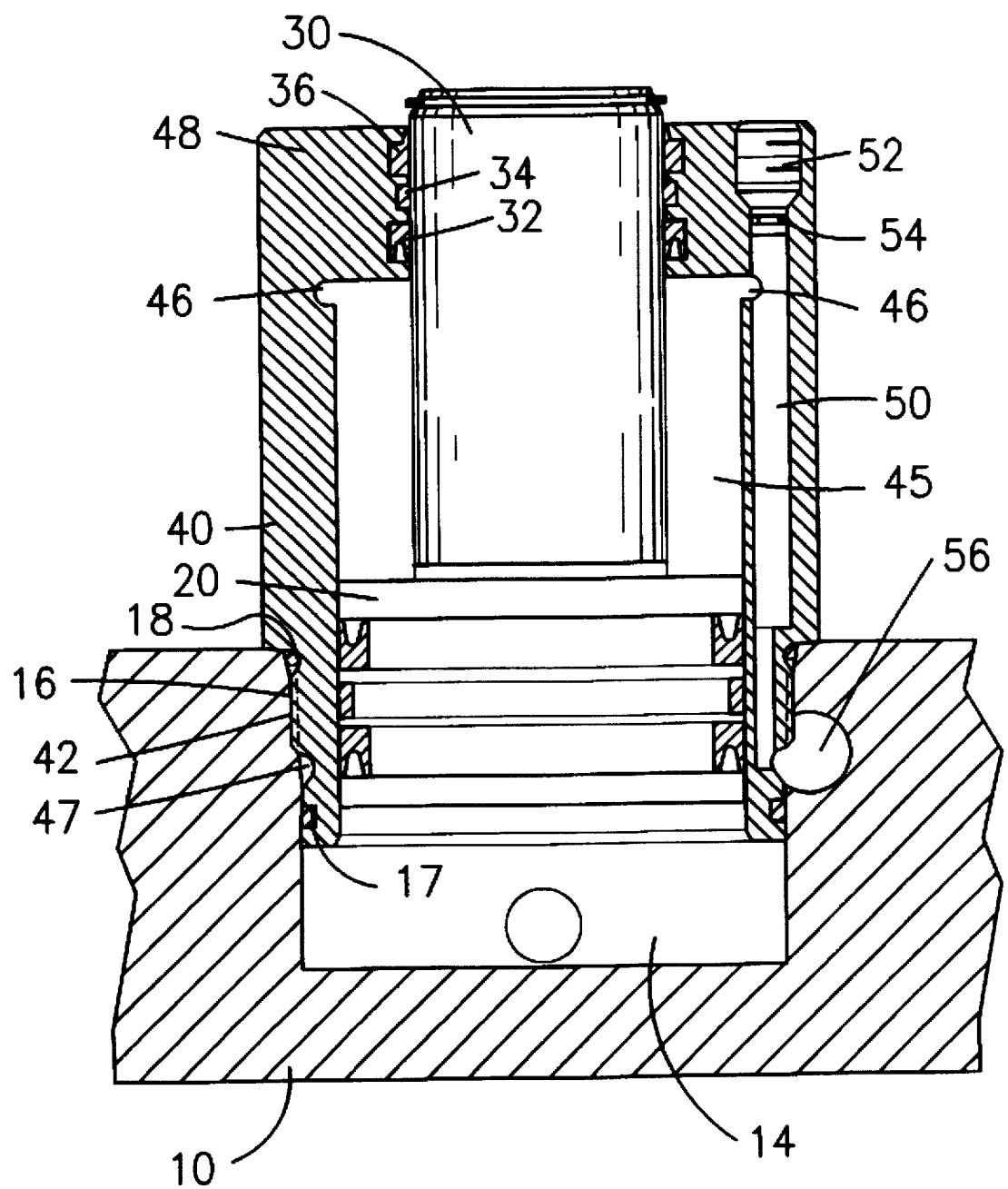
FIG. 3: Gas cylinder element according to FIGS. 1 or 2, sectional, piston in bottom dead center.

Above the piston 20 there is provided a further work space in the area of the cylinder bore 44, namely the ring space 45, which is formed between the piston 20, the piston rod 30, the cylinder bore 44, and the cylinder head 48. The volume of the ring space 45 is likewise variable, and this is in dependence upon the instantaneous position of the piston 40. The volume is minimal, insofar as the piston 20 is in the start position as shown in FIG. 1 or 2 at the top dead center, and is maximal when the piston 20 is found at the bottom dead center as shown in FIG. 3.

The ring space 45 is completely filled with oil following measures set forth below in greater detail, wherein the oil serves not only for lubrication of the cylinder running surface and the piston rod 30, but also for governing the return movement (upwards movement) of the piston 20. In accordance with the invention there is thus formed a self-contained fluid system, which includes the ring space 45, in order to block the return stroke of the piston 20 through a manipulative control of the oil flow, and only then to initiate the return stroke when it is permitted or, as the case may be, necessary, as a result of the completion of a work step.

For this purpose a canal 50 is provided in the cylinder 40, which transcends this completely essentially in the axial direction. The canal 50 also passes through the cylinder head 48 and is tightly sealed off by a ventilation screw 52 provided with a sealing ring 54. The canal 50 is in fluid communication with the ring space 45, and this mainly through a circumscribing notch 46, which is cut into the cylinder bore 44 at the upper end of the ring space 45 and immediately adjacent the cylinder 48 and it communicates with the canal 50.

At the lower end, the canal 50 ends in an axial position which corresponds with the position of a bore 56 formed in the tank platform 10. The canal 50 is in communication with a circumscribing notch 47 cut in outside on the cylinder 40, so that a fluid connection exists from the canal 50, via the peripheral or circumferential section of the notch 47 to the bore 56. Further, a sealing ring 17 is provided in the lower area of the cylinder 40, which is pressed against the tank platform 10 in the area of the recess 14.

As can be further seen from FIG. 1, the bore 56 extends to the outer side of the tank platform 10. At this position a 2/2 way valve is provided, which can be controlled, and of which the function is as discussed in greater detail in the following. At the beginning a storage tank 70 is connected to a valve via a pipe 62. In the inside of the storage tank 70 a pressure equalization membrane 72 is provided. Therewith there is provided in the high pressure storage tank an area, which contains a pressure equalization medium (gas) and therewith maintains the pressure equalization membrane 72 constantly urged against the fluid system.

The fluid system, which is comprised of the oil containing segment of the storage tank 70, the pipe 62, the valve 60, the bore 56, the notch 47, the canal 50, the notch 46, and the ring space 45, contain oil, which is under over-pressurization.

In the starting position as shown in FIGS. 1 and 2, the valve 60 is switched through so that the fluid system is unimpeded. As soon as the piston rod 30 of the piston 20, upon being impacted, begins to be pressed away from the there shown top dead center towards downwards, the ring space 45 is enlarged and the oil is drawn out of the storage tank 70. The pressure equalization membrane 72 ensures therefore, that the system pressure in the fluid system is at this time substantially maintained constant.

Upon arrival at the bottom dead center as shown in FIG. 3 the valve 60 is switched and blocks the passage from the bore 56 to the pipe 62. Although the piston 20 has the desire, as a result of the over-pressurization condition in the pressure gas reservoir 12, to return back to its top dead center, it is however thereby prevented, in that the oil now found in the ring space 45 cannot be displaced. The piston 20 is thereby locked into the bottom dead center.

Upon further control of the valve 60 after a predetermined amount of time, the passageway from the bore 56 to the pipe 62 is newly made free, so that at this time oil can be conveyed back to the storage tank 70, and this by the initiation of the return movement of the piston 20. Finally the starting position as shown in FIGS. 1 and 2 is achieved.

Hereby it is possible, to initiate the return movement of the piston 20 only at that point in time, in which it is desired.

What is not shown here is the possibility, to influence the speed of the return stroke, which can be accomplished by the variable constriction at a suitable place in a fluid system, for example, in the area of the valve 60, in order to change the flow resistance for the return flowing oil.

| REFERENCE NUMERALS | |
|---|---|
| 10 Tank platform | 50 Canal |
| 12 Pressure gas reservoir | 52 Ventilation screw |
| 14 Recess | 54 Sealing ring |
| 16 Thread | 56 Bore |
| 17 Sealing ring | 60 Valve |
| 18 Sealing ring | 62 Pipe |
| 20 Piston | 70 Storage tank |
| 22 Sealing ring | 72 Pressure Equalization Membrane |
| 24 Sealing ring | 74 Pressure Equalization Medium |
| 26 Guide band | T.D.C. Top dead center |
| 30 Piston rod | B.D.C. Bottom dead center |
| 32 Sealing ring | |
| 34 Guide ring | |
| 36 Scrapper ring | |
| 40 Cylinder | |
| 42 External thread | |
| 44 Cylinder bore | |
| 45 Ring space | |
| 46 Notch | |
| 47 Notch | |
| 48 Cylinder head | |

What is claimed is:

1. A gas cylinder element comprising:
   a tank platform;
   at least one cylinder having a longitudinal axis, one end of which cylinder is seated on the tank platform sealed against high pressure, the other end of said cylinder having a cylinder head;
   a piston provided to be axially displaceable between a rest position and an extended position and sealed against high pressure, said piston having a front face and a back face and dividing said cylinder into a hydraulic chamber and a pressure gas chamber, wherein said pressure gas chamber is filled with gas under pressure, and wherein said hydraulic chamber is between said back face of said piston and said cylinder head, wherein said hydraulic chamber and said pressure gas chamber vary inversely in size depending upon force applied to the piston, and wherein said gas in said pressure gas chamber exerts a spring effect to urge the piston toward said rest position;
   a piston rod for transmitting force to said piston, said piston rod extending through said cylinder head;
   a hydraulic fluid reservoir in fluid communication via a hydraulic conduit with said hydraulic chamber;
   a valve for regulating flow in said conduit;
   wherein said hydraulic reservoir (70), said hydraulic conduit (50, 56, 62) inclusive of valve (60) and the hydraulic chamber (45) form a self-contained, sealed fluid system completely filled with hydraulic fluid; and
   wherein said valve (60) is so designed, that
   (a) during extension of the piston (20) the valve is open, so that hydraulic fluid can flow out of the hydraulic fluid reservoir (70) into the hydraulic chamber (45),
   (b) upon completion of a stroke of the piston (20) said valve is closed, so that a return flow of the oil out of the hydraulic chamber (45) into the hydraulic reservoir (70) is prevented and therewith the piston (20) is detained in the extended position, and
   (c) said valve may be opened when desired so that oil can return flow out of the hydraulic chamber (45) back into the hydraulic reservoir (70), and the piston (20), as a result of the spring effect of the gas, can return to its rest position.

2. A gas cylinder element according to claim 1, wherein the hydraulic fluid is under a pressure of between 5 and 100 bar.

3. A gas cylinder element according to claim 1, wherein the hydraulic fluid is under a pressure of between 20 and 50 bar.

4. A gas cylinder element according to claim 1, wherein said hydraulic reservoir is a storage tank (70) with a pressure equalization membrane (72).

5. A gas cylinder element according to claim 1, wherein at least one canal (50) is provided in the cylinder (40), which passageway is in communication at one end with the hydraulic chamber (45) and at its other end is in communication with a bore (56) provided in the tank platform (10), said passageway forming a partial section of the conduit (50, 56, 62) is formed.

6. A gas cylinder element according to claim 5, wherein said canal (50) extends upwardly through the cylinder head (48) and is closed off with a ventilation screw (52) which forms a pressure tight seal.

7. A gas cylinder element according to claim 5, wherein a circumscribing notch (46) is provided at the end of the hydraulic chamber (45) immediately adjacent to the cylinder head (48), which circumscribing notch is in fluid communication with the canal (50).

8. A gas cylinder element according to claim 5, wherein a circumscribing notch (47) which is provided at the outside of the cylinder (40), one end of said circumscribing notch (47) being in communication with the canal (50) and on the other end being in communication with the bore (56) in the tank platform (10).

9. A gas cylinder element claim 1, wherein said the valve (60) is provided in close proximity to the hydraulic reservoir (45).

10. A gas cylinder element claim 1, wherein said the valve (60) is provided immediately on the tank platform (10).

11. A gas cylinder element according to claim 1, including means to vary the flow resistance in the conduit (50, 56, 62).

12. A gas cylinder element according to claim 1, including means for controlling the time interval between the completion of said piston stroke and the opening of said valve (60).

13. A gas cylinder element according to claims 1, including means responsive to an event for triggering the opening of said valve (60).

14. A gas cylinder element claim 1, wherein the valve (60) is provided immediately on the tank platform (10).

* * * * *